Sept. 25, 1962 E. BEYER 3,056,134

TRANSPORTING APPARATUS FOR RECORD SHEETS

Original Filed July 21, 1953 4 Sheets-Sheet 1

INVENTOR.
EUGEN BEYER, DECEASED,
BY MARTHA BEYER,
FRED R. BEYER,
DIANA BEYER,
CHRISTA BEYER, HIERS.

BY Michael S. Striker
Attorney

Sept. 25, 1962 E. BEYER 3,056,134

TRANSPORTING APPARATUS FOR RECORD SHEETS

Original Filed July 21, 1953 4 Sheets-Sheet 2

INVENTOR.

EUGEN BEYER, DECEASED,
BY MARTHA BEYER,
FRED R. BEYER,
DIANA BEYER,
CHRISTA BEYER, HEIRS

BY Michael S. Striker
Attorney

INVENTOR.

EUGEN BEYER, DECEASED,
BY MARTHA BEYER,
FRED R BEYER,
DIANA BEYER,
CHRISTA BEYER, HIERS.

BY Michael S. Striker
Attorney

INVENTOR.

EUGEN BEYER, DECEASED,
BY MARTHA BEYER,
FRED R. BEYER,
DIANA BEYER,
CHRISTA BEYER, HEIRS.

BY Michael S. Striker
Attorney

United States Patent Office 3,056,134
Patented Sept. 25, 1962

3,056,134
TRANSPORTING APPARATUS FOR RECORD SHEETS

Eugen Beyer, deceased, late of Heilbronn (Neckar), Germany, by Martha Beyer, nee Feist, Fred R. Beyer, Diana Beyer, and Christa Beyer, all of Heilbronn (Neckar), Germany, heirs, assignors to said Martha Beyer, Fred R. Beyer, Diana Beyer, and Christa Beyer
Original application July 21, 1953, Ser. No. 369,384, now Patent No. 2,946,593, dated July 26, 1960. Divided and this application June 30, 1960, Ser. No. 40,105
Claims priority, application Germany July 21, 1952
7 Claims. (Cl. 346—22)

The present invention relates to a transporting apparatus for record sheets which is preferably used with a recording and reproducing machine by which dictation is recorded and played back, whenever desired.

The present application is a divisional application of copending application for Magnetic Recording and Reproducing Equipment, Serial No. 369,384, filed on July 21, 1953, now Patent No. 2,946,593, and claiming priority based on an application filed in Germany on July 21, 1952.

It is one object of the present invention to provide a transporting apparatus which will automatically feed a new record sheet to the recording and reproducing machine whenever a record sheet is discharged from the machine, so that recording or playback can be continuously made by using successive record sheets.

Another object of the present invention is to provide a transporting apparatus for record sheets which automatically operates to feed a new record sheet whenever a record sheet is discharged by the machine.

Another object of the present invention is to provide a transporting apparatus for record sheets which is controlled by sensing means which determine whether or not a record sheet was discharged by the machine.

Another object of the present invention is to provide a semi-automatic transporting arrangement for record sheets in which the operator actuates a single control means for effecting simultaneous discharge of a record sheet from the machine, and feeding of a new record sheet to the machine.

With these objects in view, one embodiment of the present invention comprises a rotary member which is part of a recording and reproducing machine and transports record sheets wrapped about the peripheral surface thereof; a first support for supporting a fed record sheet; a second support for receiving discharged record sheets from the rotary member; transporting roller means between said supports engaging the record sheets on the same; pressure means, for example a pressure roller, movable to and from a transporting position for pressing a record sheet on the first support against the transporting roller means; operating means for moving the pressure roller means to and from the transporting position thereof; stop means movable between a blocking position preventing passage of record sheets from the rotary member to the second support and a retracted position permitting passage of record sheets; actuating means for shifting the stop means between the above mentioned positions; and control means operatively connecting the operating means and the stop means. In this manner, the pressure roller is in the transporting position only when the stop means is retracted, and a new record sheet is only transported by the transporting roller means to the rotary member when the previously transported record sheet is discharged by the rotary member onto the second support.

In one embodiment of the present invention, the control means include sensing means in the form of a switch which is actuated when sensing a record sheet transported on the second support. The sensing switch is connected into the circuit of electromagnetic means which form part of the operating means by which the pressure roller means is moved to and from the transporting position thereof. In this embodiment, the control means are electrically controlled, whereas in another embodiment of the present invention, the control means include manually operated means which simultaneously effect discharge of an old record sheet, and feeding of a new record sheet to the rotary transporting member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
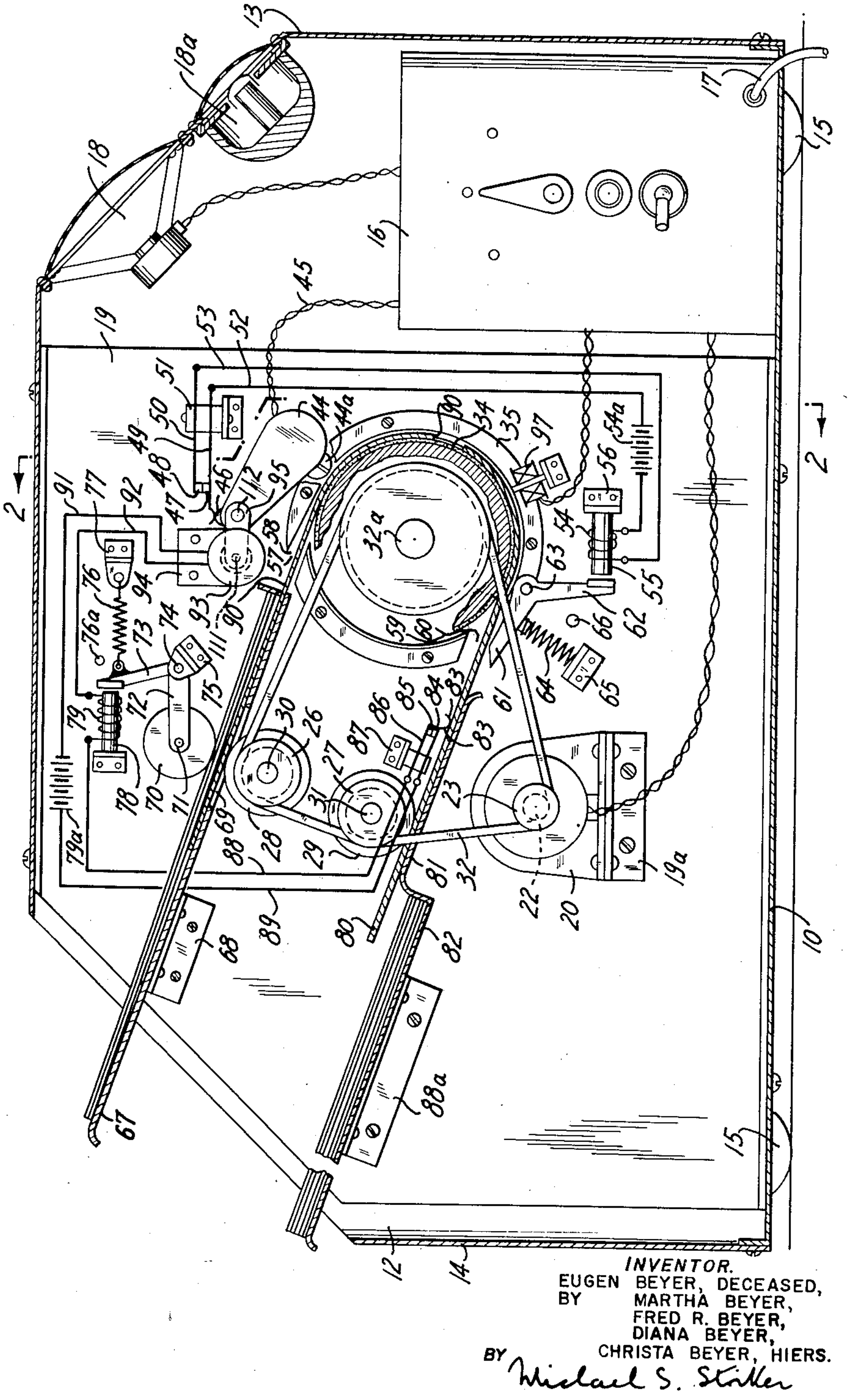
FIG. 1 is a diagrammatic side view, partly in section, of a machine incorporating the transporting apparatus according to one embodiment of the present invention.

Referring now to the drawings, a casing includes a bottom wall 10, side walls 11 and 12, a front wall 13 and a rear wall 14, and is supported on rubber feet 15. The front wall of the casing carries the electrical equipment 16 which is connected to a source of electric power by a cord 17. Front wall 13 also carries a microphone 18*a* and a speaker 18*x*.

Figure 2:
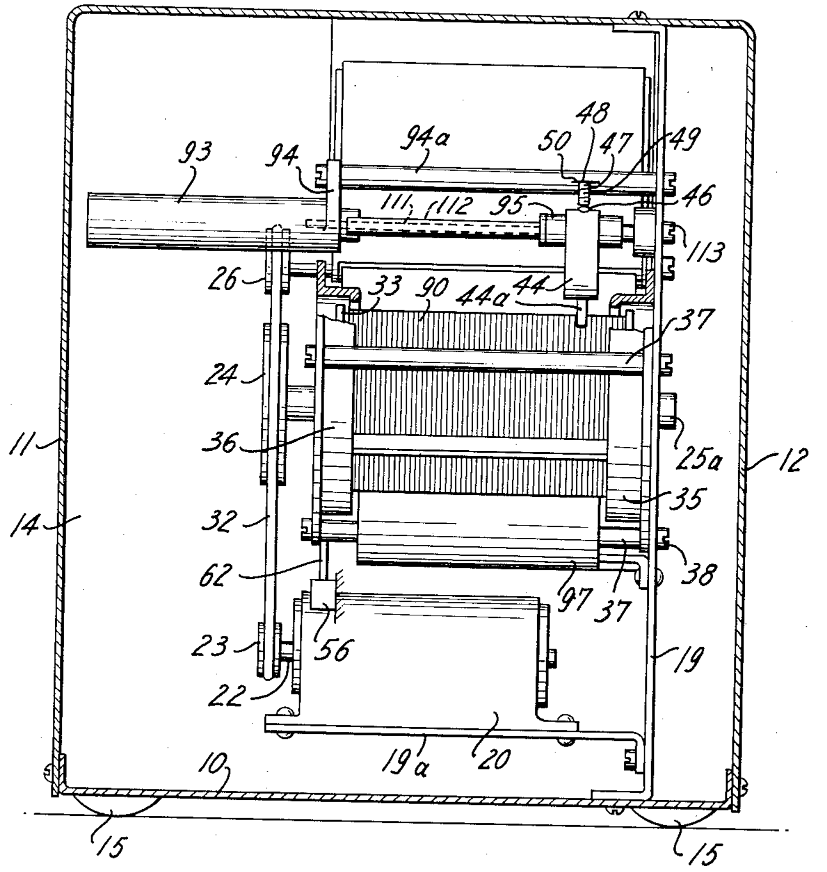
FIG. 2 is a sectional view taken on line 2—2 in FIG. 1.
Figure 3:
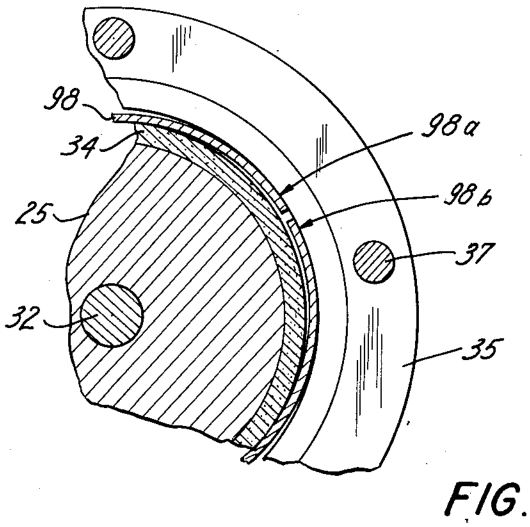
FIG. 3 is a fragmentary cross-sectional view illustrating the position of the record sheet on the rotary transporting member.

An electric motor 20 has a cord 21 and is mounted on a bracket 19*a* which is secured to an intermediate wall 19 as best seen in FIG. 2. Shaft 22 of motor 20 carries a pulley 23 which drives through a belt 32 three pulleys 24, 26 and 27. Pulley 24 is fixed to a rotary drum member 25, pulley 26 is secured to a transporting roller 28, and pulley 27 is secured to a transporting roller 29. Shafts 30 and 31 are mounted on the casing and turnably support transporting rollers 28 and 29.

The rotary drum member 25 and pulley 24 are turnably mounted on a shaft 32*a* which is secured to wall 19 at 25*a* and supports a pair of end flanges 33, as best seen in FIG. 2. Drum member 25 is made of a non-magnetic material, and has a resilient surface layer 34. A pair of guide rings 35 and 36 are located at opposite ends of member 25, and are held together and mounted on wall 19 by rods 37 and screws 38. As best seen in FIGS. 3 to 6, rings 35 and 36 have inner edges 40 and 41 which are spaced from the peripheral surface 34 of drum member 25 a distance somewhat greater than the thickness of the record sheet 98 in FIG. 3 so that the ends 98*a* and 98*b* of the record sheet 98 are slightly spaced from each other and slide on the inner guide faces 40 and 41 of rings 35 and 36 when the record sheet 38 is transported by the rotary member 25, 34. A rod 112 supports a scanning head 44 for turning movement and also for movement along the length of rod 112 in axial direction of the rotary member 25, 34. Rod 112 is secured at 113 to the supporting wall 19. Conductors 45 connect the scanning head 44 with the electrical equipment 16. Scanning head 44 has a scanning part 44*a* and a projection 46 which operates a pair of contacts 47 and 48 of a pair of contact springs 49 and 50 which are mounted on an insulating support 51. Conductors 52 and 53 are connected to the contact springs 49 and 50 and connect the same to a coil 54 wound on a magnetic core 55 which is secured to a support 56. A battery 54*a* is connected into the circuit of the electromagnetic means 54, 55.

Guide rings 35 and 36 have inlet openings 57 and 58 through which record sheets may successively pass into the space between the arcuate guide faces 40, 41 and the peripheral surface of rotary member 25, 34. Outlet openings 59 and 60 are provided in rings 35 and 36 through which record sheets are discharged and ejected.

The outlet opening 59 of ring 35 is normally closed by an arm 61 of a closure means 61, 62 which is turnably mounted on a pin 63 on ring 35. Arm 62 is made of iron and constitutes an armature for the electromagnetic means 54, 55 so that the closure means 61, 62 is turned about pin 63 when the winding 54 is energized by closed contact points 47, 48. A spring 64 abuts on a support 65 and urges closure means 61, 62 in a position closing outlet opening 59 in which a stop 66 engages arm 62.

A stack of record sheets is located on a first support 67 which has a cutout 69 into which transporting roller 28 projects so as to engage the lowest record sheet 90 of the stack. A pair of arms 72 is turnably mounted on a pin 74 of a supporting bracket 75, and supports a pressure roller means 70 turnably about a shaft 71. Another arm 73 is secured to shaft 74 and turns with arm 72. Arm 73 is connected to the spring 76 which is secured to the stationary supporting bracket 77 and tends to turn the bell-crank lever 72, 73 into a position in which the transporting roller 70 is raised from the stack of sheets. An electromagnetic means including a winding 79 and a core 78 cooperates with arm 73 to attract arm 73 when winding 79 is energized, whereby pressure roller means 70 is moved to a transporting position pressing the stack of record sheets, and more particularly the lowest record sheet 90, against transporting roller 28, so that record sheet 90 is fed through the inlet openings 57, 58 into the space between the rotary member 25, 34, and the inner guide faces 40, 41. A battery 79*a* is connected into the circuit of winding 79 which also includes a pair of contact springs 86 mounted on an insulating member 87. Contact points 85, 84 are secured to contact springs 86 which tend to move apart into a position in which contact points 84, 85 are separated.

A second support 81 receives record sheets discharged by rotary member 25, 34 through the outlet openings 59 and 60. When a record sheet 80 passes over support 81, it engages an extension 83 of the lower contact spring 86 and effects closing of contact points 84, 85. When there is no record sheet located on support 81, extension 83 moves toward support 81, and contact points 84, 85 open. When a record sheet 80 has been transported by the action of rotary member 25 to a position in which its leading portion engages transporting roller 29, record sheet 80 is further transported by transporting roller 29 to a receptacle 82 mounted on a supporting bracket 88*a*.

As best seen in FIG. 2, an electromagnetic means including a coil 93 and a movable armature 111 is supported on a rod 94*a* which is secured to wall 19 by a bracket 94. The movable armature is connected to the scanning head 44 by a link 95. As shown in FIG. 1, coil 93 is connected by a conductor 91 to the battery 79*a*, and by a conductor 92 to one end of winding 79. Consequently, coil 94 is energized simultaneously with winding 79 when contact points 84, 85 engage each other when sensing member 83 senses a discharged record sheet 80 on support 81.

An erasing head 97 is provided in the region of the rotary member 25 to erase recordings on the record sheets in a conventional manner.

Figure 4:
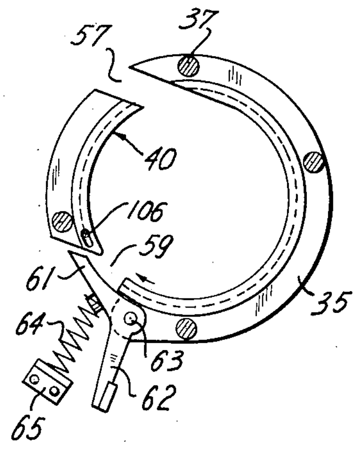
FIG. 4 is a fragmentary sectional view taken on line 4—4 in FIG. 5.
Figure 5:
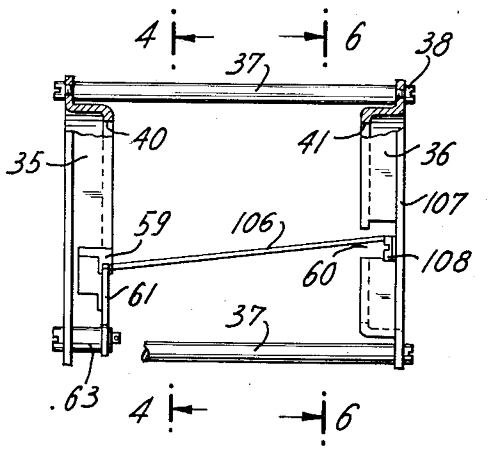
FIG. 5 is a front view illustrating a guide means for guiding record sheets transported by the rotary member of the machine.
Figure 6:
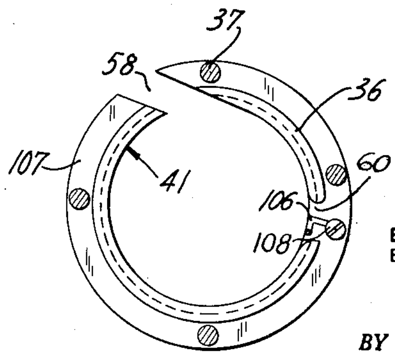
FIG. 6 is a fragmentary sectional view taken on line 6—6 in FIG. 5.

As best seen in FIGS. 5 and 6, an elongated wire 106 connects a portion of ring 35 adjacent outlet 59 to the flange 107 of ring 36, where wire 106 is secured by a screw 108. The outlet openings 59 and 60 are staggered in circumferential direction of the rotary member 25, so that wire 106 is inclined to the axis of the rotary member 25 and of shaft 32. Due to wire 106, and to the offset position of outlet 59 and 60, a record sheet transported by rotary member 25, 34 will not pass through the outlet opening 60 when the outlet opening 59 is closed by closure member 61 as shown in FIG. 4.

The automatic transporting apparatus of the present invention operates in the following manner:

Motor 20 drives rotary drum member 25 with resilient sleeve 34 and transporting rollers 28 and 29 at a uniform speed. A record sheet 98 located in the space between rotary member 25, 34 and guide surfaces 40, 41 in the position of FIG. 3 will be transported by the drum, since due to the resiliency of the record sheet 98, the slightly spaced end portions 98*a* and 98*b* engage the guide surfaces 40, 41, while the remaining part of the record sheet is frictionally engaged by the sleeve 34 of the rotary transporting member. At the beginning of the operation, the scanning head 44 will be on the left of the rotary member as viewed in FIG. 2 and will ride in helical tracks of the record sheet while the same performs as many revolutions with transporting member 25 as are required for transporting the head to the terminal position on the right of rotary member 25, as viewed in FIG. 2. When the head 44 has scanned the entire sheet, projection 46 closes contact points 47 and 48, and completes the circuit of winding 54 of the electromagnetic means 54, 55, 62 so that arm 61 will move to a position opening the outlet opening 59. The leading edge of the record sheet, which slides on surface 40, will pass through opening 59 and be guided by arm 61 onto support 81. When the leading edge of record sheet 80 engages sensing member 83, switch 84, 85, 86 closes so that the circuit of electromagnetic windings 79 and 93 is completed.

The energized winding 79 attracts arm 73 and moves transporting roller 70 to its transporting position in which the stack of sheets on support 67 is pressed against transporting roller 28 so that the lowest record sheet is transported through the inlet openings 57, 58 to a position engaging the surface of the rotary member 25, 34, so that the new record sheet is transported wrapped about rotary member 25, 34. The sensing means 83 to 86 is positioned in such a manner that the new record sheet is fed in a position in which its leading edge is spaced a very short circumferential distance from the trailing edge of the discharge record sheet 80.

When switch 84 to 86 closes, coil 93 is energized, and the armature 111 moves scanning head 44 to the left end position as viewed in FIG. 2. This operation is timed in such a manner that portion 44*a* of scanning head 44 passes through the gap between the newly fed record sheet and the discharged record sheet.

At the beginning of such movement of the scanning head 44, contacts 47 and 48 are separated, since projection 46 released contact spring 49. The circuit of winding 54 is interrupted, and spring 64 moves arm 61 to a position closing the outlet opening 59 in the moment in which the trailing edge of record sheet 80 has passed through outlet opening 59. The leading edge of the newly fed record sheet reaches the outlet opening 59 when the same is already closed, so that the newly fed record sheet is transported by rotary member 25, 34 in the space between the peripheral surface thereof and the guide surfaces 40 and 41, while the record sheet is being scanned by scanning head 44, 44*a*.

The operation of the scanning head is not an object of the present invention, and has been described for a better understanding of the transporting apparatus of the present invention. From the above description of the transporting apparatus by which the record sheets are transported, it will become apparent that members 72 to 79 constitute operating means for moving the pressure roller means 70 to and from a transporting position for pressing a record sheet on the support 67 against the transporting roller 28 of transporting roller means 28, 29. Lever arm 61 constitutes a stop means which is movable between a blocking position closing outlet 59 and a retracted position permitting passage of record sheets to support 81.

Elements 54, 55, 62 and 64 constitute actuating means for shifting stop means 61 between the blocking position preventing passage of record sheets to support 81, and the retracted position shown in FIG. 1. Control means operatively connect the electromagnetic means 78, 79 of the operating means 72 to 79 with the actuating means 54, 55, 62 and 64 of stop means 61 in such a manner that the pressure roller 70 is in the transporting position only when stop means 61 is retracted and the record sheet 80 is transported on support 81 by rotary member 25, 34 and transporting roller 29. The control means include sensing means, namely switch 83 to 86 which are electrically connected to the electromagnetic means 78, 79 of the operating means of pressure roller 70. As explained above, switch 83 to 86 also effects through electromagnetic means 93 opening of switch 47 to 50, and operation of stop means 61 by spring 64 of the actuating means.

Figure 7:
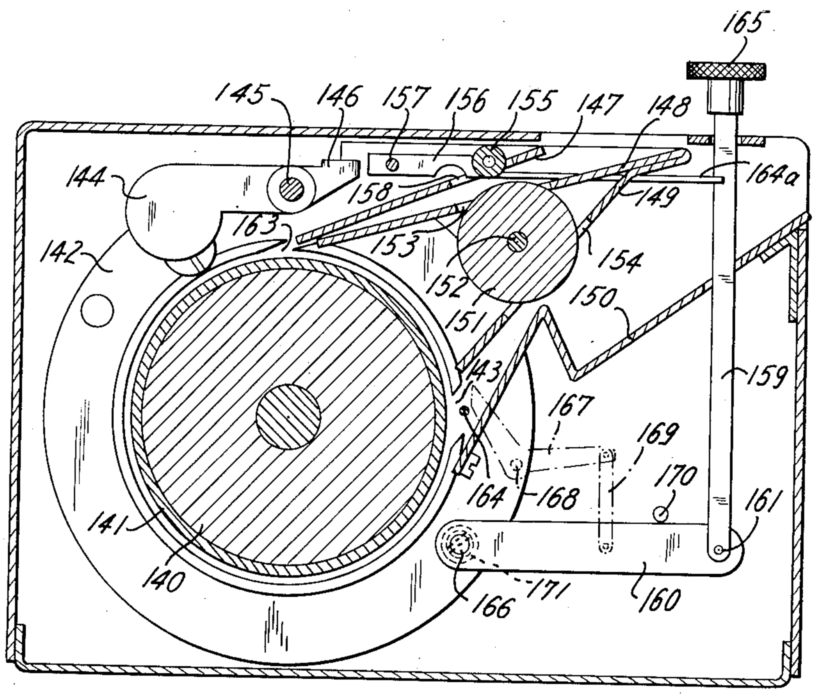
FIG. 7 is a fragmentary cross-sectional view illustrating another embodiment of the present invention in which the transporting apparatus is manually actuated.

FIGS. 1 and 2 illustrate an embodiment of the present invention in which record sheets are automatically fed and ejected. FIG. 7 illustrates a semi-automatic transporting apparatus in accordance with another embodiment of the present invention.

A rotary member 140 is driven by a motor, not shown, corresponding to the arrangement described with reference to FIG. 1, and has a sleeve 141 on the periphery thereof which defines a circular space with a pair of guide means corresponding to the guide means 35 and 36 of the embodiment of FIG. 1, only one guide ring 142 being shown in FIG. 7. Guide rings 142 have inlet openings 163 and outlet openings 143 provided with an inclined wire 164, as previously described. One outlet opening 143 is controlled by a stop means 167 which is pivotally mounted on a pin 168 on guide ring 142.

When stop means 167 is in the illustrated position closing the outlet opening 143, a record sheet, not shown, will be transported by rotary member 140, 141 to revolve with the same. A scanning head 144 is mounted on a shaft 145 for movement in axial direction of rotary member 140, and also turnable to and from a scanning position engaging a helical groove on the revolving record sheet. Scanning head 144 has a manually operated projection 146, by which scanning head 144 can be raised to be disengaged from a record sheet after the same has been scanned. After scanning of a record sheet, the scanning head is also shifted along the length of shaft 145 to the other end of rotary member 140 to engage the first part of the groove of another record sheet. This arrangement is not an object of the present invention.

A guideway is provided for guiding a new record sheet into the inlet openings 163, and is formed by an upper wall 147 and by a lower wall 148, wall 148 extending substantially in tangential direction of the rotary drum member 140, 141. The upper wall 147 has a cutout 158, and the lower wall 148 has a cutout 153 located substantially opposite the cutout 158. Another guideway is located in the region of outlet openings 143, and includes an upper wall 149 with a cutout 154, and a lower wall 150 which extends substantially in tangential direction of the rotary drum member 140, 141. The lower wall is formed with a depressed portion 158 serving as a receptacle for discharged record sheets.

A driven transporting roller means 151 is mounted on a shaft 152 and located between walls 148 and 149. Portions of transporting roller means 151 project through cutouts 153 and 154 into the two guideways, so as to engage record sheets located on supports 148 and 150.

A pressure roller means 155 is turnably mounted on a pair of operating lever means 156 which are pivotally supported on a shaft 157. A control lever **164*a* is secured to the operating lever means 156, and connected to a control rod 159 which carries a pushbutton 165. When pushbutton 165 is depressed, pressure roller means 155 moves through cutout 158 to a transporting position pressing a record sheet, not shown, supported on wall 148 against the periphery of the rotating transporting roller 151 so that the record sheet is transported through the inlet openings 163 and is engaged and further transported by the rotating drum member 140, 141. As long as the outlet opening 143 is closed by stop means 167, the record sheet will revolve during successive revolutions of rotary member 140, 141, while being scanned by record head 144.**

The angular stop lever means 167 is connected by a link 169 to an actuating lever 160 which is pivotally mounted on a shaft 166 on guide rings 142, and is urged by a torsion coil spring 171 to turn in counter clockwise direction as viewed in FIG. 7 until lever 160 abuts a stop 170. In this position, stop lever 167 is in a position blocking passage of the transported record sheet through outlet opening 143 into the guideway 149, 150. The free end of actuating lever 160 is articulated at 161 to the control rod 159, levers 160 and **164*a*** extending substantially parallel to each other.

Assuming that a record sheet has been transported by rotary member 140, 141 through so many revolutions as were required for the complete scanning of the record sheet, while the scanning head has travelled along the axial length of drum member 140, 141, the scanning head 144 has scanned the entire record sheet, and is in one end position. The operator depresses control button 165, so that pressure roller means 155 moves to its transporting position, while stop means 167 is simultaneously retracted from the outlet opening 143. The leading edge of the transported record sheet passes through outlet opening 143 and is further transported by rotary member 140, 141 toward transporting roller 151, whereupon it is engaged by transporting roller 151 and further transported until it is deposited in the recaptacle formed by wall **150*a*. A record sheet previously placed by the operator on wall 148 of the upper guideway, is pressed by the lowered pressure roller means 155 against the rotating transporting roller means 151, and is fed through inlet 163 into the space between the guide rings 142 and the rotary member 140, 141, so that it is transported by rotary member 140, 141. Consequently, the control means 159, 165 can be immediately released by the operator, but the record sheet passing through opening 143 will prevent return of stop means 167 to the blocking position and thereby hold the manually controlled means against the action of spring 171 until the trailing edge of a discharged record sheet has passed through outlet opening 143.**

It will be understood that each of the elements described above, or two or more together, may also find a useful application in other types of sheet transporting apparatus differing from the types described above.

While the invention has been illustrated and described as embodied in transporting apparatus for transporting record sheets through a recording and reproducing machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a sheet feeding arrangement, in combination, a transporting apparatus comprising a rotary member for transporting sheets wrapped about the peripheral surface thereof; a first support located adjacent said rotary member for supporting a sheet; a second support located adjacent said rotary member for receiving a transported sheet from the same; transporting roller means between said first and second supports and adapted to engage a sheet on said first support and a sheet on said second support; pressure means adjacent said first support and being movable to and from a transporting position for pressing a sheet on said first support against said transporting roller means; operating means for moving said pressure means to and from said transporting position; stop means movable between a blocking position located between said rotary member and said second support for preventing passage of sheets from said rotary member to said second support and a retracted position permitting passage of sheets; actuating means for shifting said stop means between said positions; and control means operatively connecting said operating means and said actuating means so that said pressure means is in said transporting position only when said stop means is in said retracted position and the sheet is transported on said second support by said rotary member and by said transporting roller means whereby a new sheet is fed to said rotary member when the preceding sheet is discharged by said member onto said second support.

2. In a recording and reproducing machine, in combination, a transporting apparatus comprising a rotary member for transporting record sheets wrapped about the peripheral surface thereof; a first support adjacent said rotary member for supporting a record sheet; a second support adjacent said rotary member for receiving a record sheet from the same; transporting roller means between said first and second supports and adapted to engage a record sheet on said first support, and a record sheet on said second support; pressure means adjacent said first support and being movable to and from a transporting position for pressing a record sheet on said first support against said transporting roller means; operating means for moving said pressure means to and from said transporting position; and sensing means located adjacent said second support for sensing a record sheet transported on the same by said rotary member and said transporting roller means, said sensing means being operatively connected to said operating means to actuate the same to move said pressure means to said transporting position when said sensing means senses a record sheet whereby a new record sheet is fed to said rotary member when the preceding record sheet is discharged by said member onto said second support.

3. In a recording and reproducing machine, in combination, a transporting apparatus comprising a rotary member for transporting record sheets wrapped about the peripheral surface thereof; a first support located adjacent said rotary member for supporting a record sheet; a second support located adjacent said rotary member for receiving a transported record sheet from the same; transporting roller means between said first and second supports and adapted to engage a record sheet on said first support and a record sheet on said second support; pressure means adjacent said first support and being movable to and from a transporting position for pressing a record sheet on said first support against said transporting roller means; operating means for moving said pressure means to and from said transporting position; stop means movable between a blocking position located between said rotary member and said second support for preventing passage of record sheets from said rotary member to said second support and a retracted position permitting passage of record sheets; actuating means for shifting said stop means between said positions; and control means operatively connecting said operating means and said actuating means so that said pressure means is in said transporting position only when said stop means is in said retracted position and the record sheet is transported on said second support by said rotary member and by said transporting roller means, said control means including sensing means located adjacent said second support for sensing a record sheet transported on the same by said rotary member and by said transporting roller means and being operatively connected to said operating means to actuate said operating means to move said pressure means to said transporting position when said sensing means senses a record sheet on said second support whereby a new record sheet is fed to said rotary member when the preceding record sheet is discharged by said member onto the said second support.

4. In a recording and reproducing machine, in combination, a transporting apparatus comprising a rotary member for transporting record sheets wrapped about the peripheral surface thereof; a first support located adjacent said rotary member for supporting a record sheet; a second support located adjacent said rotary member for receiving a transported record sheet from the same; transporting roller means between said first and second supports and adapted to engage a record sheet on said first support and a record sheet on said second support; pressure means adjacent said first support and being movable to and from a transporting position for pressing a record sheet on said first support against said transporting roller means; operating means including electromagnetic means for moving said pressure means to and from said transporting position; stop means movable between a blocking position located between said rotary member and said second support for preventing passage of record sheets from said rotary member to said second support and a retracted position permitting passage of record sheets; actuating means for shifting said stop means between said positions; and control means operatively connecting said operating means and said actuating means so that said pressure means is in said transporting position only when said stop means is in said retracted position and the record sheet is transported on said second support by said rotary member and by said transporting roller means, said control means including sensing means including a switch means located adjacent said second support for sensing a record sheet transported on the same by said rotary member and by said transporting roller means and being connected into the circuit of said electromagnetic means to actuate said operating means to move said pressure means to said transporting position when said switch means is actuated by a record sheet on said second support whereby a new record sheet is fed to said rotary member when the preceding record sheet is discharged by said member onto the said second support.

5. In a recording and reproducing machine, in combination, a transporting apparatus comprising a rotary member for transporting record sheets wrapped about the peripheral surface thereof; a first support adjacent said rotary member for supporting a record sheet; a second support adjacent said rotary member for receiving a record sheet from the same; a first transporting roller located on one side of said first support and adapted to engage a record sheet on the same; a second transporting roller located on one side of said second support and adapted to engage a record sheet on the same; pressure roller means located on the other side of said first support and being movable to and from a transporting position for pressing a stack of record sheets on said first support and thereby the outermost record sheet against said first transporting roller; operating means including electromagnetic means for moving said pressure roller means to and from said transporting position; drive means for driving said first and second transporting rollers and said rotary member; and sensing means including a switch means located adjacent said second support for sensing a record sheet transported on the same by said rotary member and said transporting roller means, said switch means being connected into the circuit of said electromagnetic means to actuate the same to move said pressure roller means to said transporting position when said switch means is actuated by a record sheet whereby a new record sheet is fed to said rotary member when the preceding record sheet is discharged by said member onto said second support.

6. In a recording and reproducing machine, in combination, a transporting apparatus comprising a rotary member for transporting record sheets wrapped about the peripheral surface thereof; a first support located adjacent said rotary member for supporting a record sheet and including a guideway for guiding the record sheet in tangential direction onto the peripheral surface of said rotary member; a second support located adjacent said rotary member for receiving a transported record sheet from the same and including a guideway for guiding the record sheet in tangential direction away from the peripheral surface of said rotary member, said first and second supports having cutouts in said guideways located opposite each other; transporting roller means between said first and second supports partly projecting through said cutouts into said guideways and adapted to engage record sheets in said guideways of said first and second supports; pressure means adjacent said first support and being movable to and from a transporting position for pressing a record sheet on said first support against said transporting roller means; operating means for moving said pressure means to and from said transporting position; stop means movable between a blocking position located between said rotary drum and said guideway of said second support for preventing passage of record sheets from said rotary member to said second support and a retracted position permitting passage of record sheets; actuating means for shifting said stop means between said positions; and control means operatively connecting said operating means and said actuating means and including manually operated means for actuating said operating means, said manually operated means being connected to said stop means for retracting the same from said guideway of said second support when said manually operated means effect movement of said pressure means to said transporting position so that said pressure means is in said transporting position only when said stop means is in said retracted position and the record sheet is transported on said second support by said rotary member and by said transporting roller means whereby a new record sheet is fed to said rotary member when the preceding record sheet is discharged by said drum onto the said second support.

7. A transporting apparatus as set forth in claim 6 wherein said operating means include a supporting lever supporting said pressure roller means; wherein said actuating means include an actuating lever extending substantially parallel to said supporting lever; wherein said manually operated means include a rod articulated to said supporting lever and to said actuating lever, and having a pushbutton; and including a link connecting said stop means with said actuating lever.

References Cited in the file of this patent

UNITED STATES PATENTS

| | | |
|---|---|---|
| 2,253,052 | Schubert et al. | Aug. 19, 1941 |
| 2,394,577 | Wise | Feb. 12, 1946 |
| 2,431,360 | Philpott | Nov. 25, 1947 |
| 2,946,593 | Beyer | July 26, 1960 |